US009745054B2

(12) United States Patent
Hilliard et al.

(10) Patent No.: US 9,745,054 B2
(45) Date of Patent: Aug. 29, 2017

(54) AIRCRAFT LANDING GEAR ASSEMBLY

(71) Applicant: SAFRAN LANDING SYSTEMS UK LTD, Gloucester (GB)

(72) Inventors: Matthew Hilliard, Liverpool (GB); Matthew Sexton, Gloucester (GB)

(73) Assignee: Safran Landing Systems UK LTD (GB)

( * ) Notice: Subject to any disclaimer, the term of this patent is extended or adjusted under 35 U.S.C. 154(b) by 0 days.

(21) Appl. No.: 14/843,284

(22) Filed: Sep. 2, 2015

(65) Prior Publication Data

US 2016/0185453 A1 Jun. 30, 2016

(30) Foreign Application Priority Data

Sep. 4, 2014 (EP) .................................... 14183602

(51) Int. Cl.
*B64C 25/42* (2006.01)
*B64C 25/34* (2006.01)

(52) U.S. Cl.
CPC .............. *B64C 25/42* (2013.01); *B64C 25/34* (2013.01)

(58) Field of Classification Search
CPC .......... B64C 25/34; B64C 25/42; B64C 25/44
See application file for complete search history.

(56) References Cited

U.S. PATENT DOCUMENTS

| | | | |
|---|---|---|---|
| 1,746,017 A | 2/1930 | Smith | |
| 2,533,607 A | 12/1950 | Neilson | |
| 2,578,200 A * | 12/1951 | Nicholl | B64C 25/44 188/2 R |
| 2,777,546 A | 1/1957 | Kelley | |
| 3,027,123 A * | 3/1962 | Westcott, Jr. | B64C 25/34 244/111 |
| 3,164,223 A * | 1/1965 | Kemp | B64C 25/34 188/17 |
| 3,322,376 A * | 5/1967 | Neilson | B64C 25/34 244/100 R |
| 3,485,465 A * | 12/1969 | Churchill | B64C 25/10 244/102 R |
| 3,544,043 A | 12/1970 | Stratford | |
| 3,845,919 A * | 11/1974 | Jenny | B64C 25/34 188/129 |

(Continued)

FOREIGN PATENT DOCUMENTS

| | | |
|---|---|---|
| GB | 402675 | 12/1933 |
| GB | 639383 | 6/1950 |

(Continued)

OTHER PUBLICATIONS

Extended European Search Report for European Application No. 14183602.3-1754 mailed Mar. 11, 2015.

*Primary Examiner* — Joseph W Sanderson
(74) *Attorney, Agent, or Firm* — RatnerPrestia

(57) ABSTRACT

An aircraft landing gear includes an axle on which wheel and brake assemblies are mounted. An adaptor member is mounted on the axle and arranged to define a brake rod connection point that is distinct from a conventional brake rod connection point defined by the brake assembly. The adaptor member is coupled to the brake assembly via an adaptor linkage that is arranged to react brake torque but arranged to permit relative movement between the adaptor member and the brake assembly in degrees of freedom which are not required to react brake torque.

13 Claims, 3 Drawing Sheets

(56) References Cited

U.S. PATENT DOCUMENTS

| | | | | |
|---|---|---|---|---|
| 4,917,334 | A * | 4/1990 | Ralph | B64C 25/34 244/102 R |
| 5,806,794 | A * | 9/1998 | Hrusch | B60T 1/065 244/110 A |
| 5,944,147 | A | 8/1999 | Berwanger | |
| 6,149,100 | A | 11/2000 | Ralph | |
| 6,354,537 | B1 * | 3/2002 | Ralph | B64C 25/34 244/102 R |
| 7,578,466 | B2 * | 8/2009 | Yourkowski | B64C 25/34 244/100 R |
| 9,067,675 | B2 * | 6/2015 | Boren | B64C 25/68 |
| 2007/0158496 | A1 | 7/2007 | Yourkowski | |
| 2007/0228825 | A1 * | 10/2007 | Perriard | B60T 8/52 303/191 |
| 2012/0256050 | A1 | 10/2012 | Hilliard | |
| 2014/0084108 | A1 | 3/2014 | Goodburn | |
| 2014/0191078 | A1 * | 7/2014 | Boren | B64C 25/68 244/13 |

FOREIGN PATENT DOCUMENTS

| | | |
|---|---|---|
| GB | 787470 | 12/1957 |
| GB | 896054 | 5/1962 |

\* cited by examiner

AIRCRAFT LANDING GEAR ASSEMBLY

BACKGROUND OF THE INVENTION

This application claims the benefit of European Application EP14183602.3, filed on Sep. 4, 2014, which is incorporated herein by reference in its entirety.

BACKGROUND OF THE INVENTION

An aircraft landing gear can include an axle for supporting one or more wheel and brake assemblies. It is common for a main landing gear to include two or more axles on a bogie beam. A brake assembly is arranged to apply a braking force to a wheel assembly in order to slow the aircraft while is it on the ground. As will be appreciated by a person skilled in the art, a brake torque is generated as a brake assembly transmits a braking force to the wheel assembly.

It is common for a brake assembly to be mounted so as to be free to rotate relative to the axle. It is therefore necessary to provide means by which the brake torque can be reacted, to inhibit the brake assembly from rotating with the wheel assembly during application of the braking force.

In this regard, it is known to provide a brake rod to react brake torque generated as a brake assembly applies a braking force to a wheel assembly. A brake rod connects a brake assembly to an anchor point on the landing gear such that the brake rod reacts brake torque either in tension or in compression.

In the case of multi axle landing gear, it is common for brake rods to be provided below and parallel with respect to the bogie beam. Brake assemblies are generally designed to be mounted on an axle in a particular orientation corresponding to this arrangement.

However, the present inventors have identified that this can result in a lack of flexibility in terms of selection of an anchor point.

SUMMARY OF THE INVENTION

In accordance with a first aspect of the present invention there is provided an aircraft landing gear assembly comprising:
  a main strut arranged to be movably coupled to an aircraft;
  an elongate axle coupled to the strut;
  a brake assembly mounted on the axle;
  an adaptor member mounted on the axle adjacent to the brake assembly, the adaptor member defining a brake rod connection point;
  a brake rod coupled to the adaptor member via the brake rod connection point and coupled to the landing gear assembly at an anchor point; and
  an adaptor linkage coupled to the brake assembly and to the adaptor member, the adaptor linkage being arranged to inhibit rotation of the brake assembly about the longitudinal axis of the axle relative to the adaptor member and being arranged to permit movement between the brake assembly and the adaptor member in one or more other degrees of freedom.

Thus, the first aspect provides an aircraft landing gear assembly including an axle on which one or more wheel and brake assemblies can be mounted. An adaptor member is mounted on the axle and arranged to define a brake rod connection point that can be distinct from a conventional brake rod connection point defined by the brake assembly. The adaptor member is coupled to the brake assembly via an adaptor linkage arranged to react brake torque and arranged to permit relative movement between the adaptor member and the brake assembly in degrees of freedom which are not required to react brake torque. Thus, the adaptor linkage builds lost motion into the coupling between the adaptor member and the brake assembly for degrees of freedom which are not required to react brake torque. This permits the adaptor member and the brake assembly to move relative to one another as the axle upon which they are mounted flexes in use, while enabling brake torque to be reacted.

The adaptor linkage can be arranged to react the rotation of the brake assembly relative to the adaptor member in tension or compression. This results in a simple solution in which the adaptor linkage can take the form of a bar or tube, similar to a brake rod.

The rod connection point can be located an angular position that is distinct from the angular position of the connection point between the adaptor linkage and the brake assembly. This enables the rod connection point to be optimally positioned for a non-conventional anchor point.

The adaptor member can be sized such that the rod connection point is spaced further from axis of the axle than a peripheral surface of the brake assembly. This enables the rod connection point to be optimally positioned for a non-conventional anchor point.

The adaptor linkage can be pivotally coupled to the brake assembly and to the adaptor member.

The brake rod can be elongate.

The strut can comprise a shock strut having a main fitting coupled to a slider and can further include a torque link arranged to inhibit relative rotation of the slider relative to the main fitting about the longitudinal axis of the main fitting. The anchor point can be defined by a torque link connection lug.

The axle can be coupled to the strut via a bogie beam. There can be more than one axle, each axle having one or more brake assemblies.

In embodiments where that are two brake assemblies on a common axle, a single adaptor linkage can on the one hand be coupled to the adaptor member and on the other hand be coupled to both of the brake assemblies on the common axle.

The adaptor member can be provided on the opposite side of the brake assembly with respect to the wheel assembly. This can reduce the impact of the adaptor member on the normal working of the brake assembly and/or can place fewer restrictions on the size and shape of the adaptor member.

BRIEF DESCRIPTION OF THE DRAWINGS

Embodiments of the invention will now be described with reference to the accompanying drawings, in which.

DETAILED DESCRIPTION OF EMBODIMENTS

Figure 1:
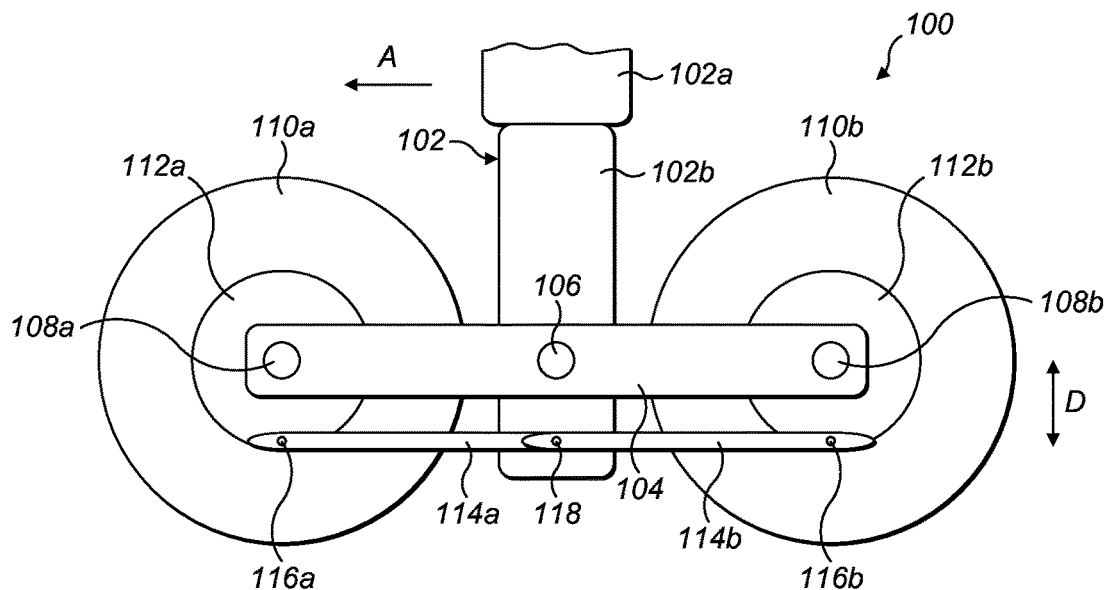
FIG. 1 is a schematic diagram of a prior art aircraft landing gear assembly.

FIG. 1 shows a schematic partial side view of a known aircraft landing gear assembly 100. The landing gear assembly 100 has a main shock absorbing strut 102 having a main fitting 102a within which a slider 102b is telescopically housed. A bogie beam 104 is pivotally mounted to a lower end region of the slider 102b at a bogie pivot 106. A torque link (not shown) couples the slider 102b to the main fitting 102a to limit relative rotation about the longitudinal axis of the main shock absorbing strut 102.

The bogie beam 104 carries a first axle 108a fore of the bogie pivot 106. The first axle 108a carries a first wheel assembly 110a and a first brake assembly 112a. The first brake assembly 112a is arranged to apply a braking force to the first wheel assembly 110a. The bogie beam 104 further carries a second axle 108b aft of the pivot axle 106. The second axle 108b carries a second wheel assembly 110b and second brake assembly 112b, the second brake assembly 112b being arranged to apply a braking force to the second wheel assembly 110b. The wheel assemblies 110a, 110b and brake assemblies 112a, 112b are each mounted so as to be freely rotatable about the longitudinal axis of a respective axle 108a, 108b on which they are mounted.

The first brake assembly 112a is mechanically coupled to the landing gear strut 102 via a first brake rod 114a. The first brake rod 114a is coupled to the main strut 102 via an anchor point 118, which may be a pin or the like, and coupled to the first brake assembly 112a via a pin 116a. Similarly, the second brake assembly 112b is mechanically coupled to the landing gear main strut 102 via a second brake rod 114b, the second brake rod 114b being coupled to the main strut 102 via the anchor point 118 and to the second brake assembly 112b via a pin 116b.

In use, with the aircraft travelling in the direction of arrow A, the brake assemblies 112a, 112b may be activated so as to apply a braking force to the wheel assemblies 110a, 110b. The brake rods 114a, 114b are arranged to react the brake torque generated due to the applied braking force. The brake torque from the first brake assembly 112a results in the first brake rod 114a experiencing a compressive force as it reacts the brake torque. The brake torque generated by the second brake assembly 112b is experienced by the second brake rod 114b as a tensile force.

The present inventors have identified that it can be desirable to move the location of an anchor point to a location that is distinct from the conventional anchor point; for example, it can be desirable to move the location of the anchor point for one of the brake rods so that a single region of the landing gear is not subjected to both brake torque reaction loads.

Figure 2:
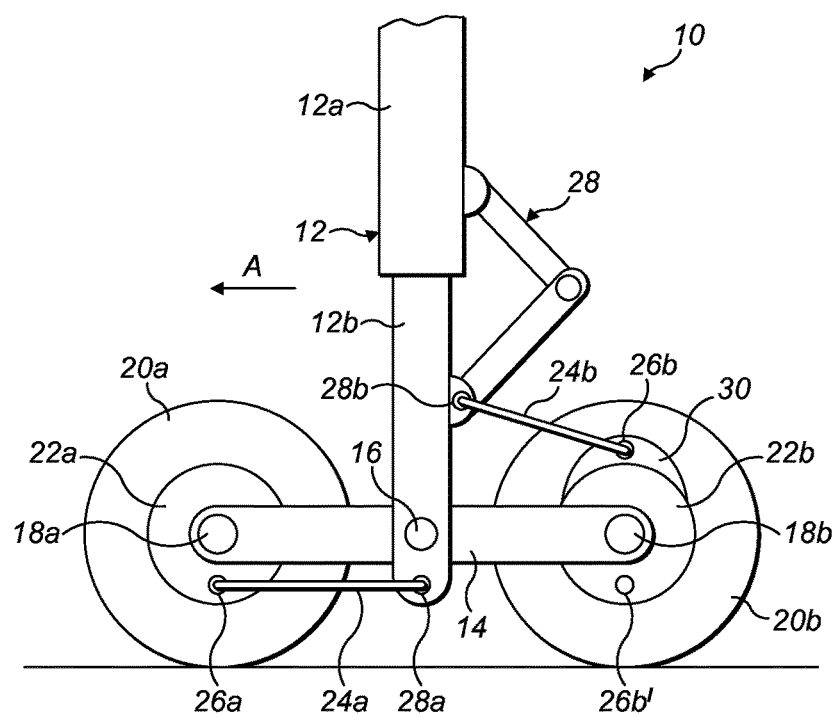
FIG. 2 is a schematic diagram of an aircraft landing gear assembly according to an embodiment of the invention.

FIG. 2 shows a schematic, partial side view of an aircraft landing gear assembly 10 according to a first embodiment of the present invention. The landing gear assembly 10 is similar to the landing gear assembly 100 in that it includes a main shock absorbing strut 12 having a main fitting 12a and a slider 12b, the slider 12b being pivotally connected to a bogie beam 14 at a bogie pivot 16.

The bogie beam 14 carries a first axle 18a fore of the bogie pivot 16. The first axle 18a carries a first wheel assembly 20a and a first brake assembly 22a. The first brake assembly 22a is arranged to apply a braking force to the first wheel assembly 20a. The bogie beam 14 further carries a second axle 18a aft of the pivot axle 16. The second axle 18b carries a second wheel assembly 20b and second brake assembly 22b, the second brake assembly 22b being arranged to apply a braking force to the second wheel assembly 20a. The first and second axles 18a, 18b are adjacent, i.e. do not have a further wheel assembly axle between them, and thus form an axle pair.

The first brake rod 24a is configured as in FIG. 1, with one end coupled to a first brake assembly connection point 26a defined by a hole on the bottom side of the first brake assembly 22a and the opposite end of the brake rod 24a being coupled to a first anchor point 28a defined by a lug at the bottom of the slider 12b.

The landing gear assembly 10 according to the illustrated embodiment differs from the known landing gear assembly 100 in that the second brake rod 24b has been moved such that a lower torque link lug defines the second anchor point 28b. This can reduce the brake reaction forces acting on the lower region of the slider 12b, which defines the first anchor point 28a.

Conventional brake assemblies are generally orientation-specific due to the location of interface points such as hydraulic control ports. This can make it difficult to mount the second brake assembly 22b on the axle 18b in an orientation in which the conventional second brake rod connection point 26b' is not in or close to the lower position as illustrated.

In order to enable the second brake assembly 22b to be coupled to the lower torque link lug 28b in an improved manner, an adaptor member 30 is provided on the axle 18b and coupled to the brake assembly 22b via an adaptor linkage. The adaptor linkage inhibits relative rotation between the adaptor member 30 and brake assembly 22b about the longitudinal axis of the axle 18b. Thus, the adaptor member 30 can be configured to define the second brake rod connection point 26b at location which is more appropriate in terms of enabling the lower torque link lug 28b to be used as the anchor point for the second brake rod 24b. In the illustrated example, the adaptor member 30 is in the form of a bell crank.

However, in use, the axle 18b can flex due to loads imposed by the aircraft (not shown). Such flexing can result in shear forces being applied to the adaptor linkage due to the parallel relationship of the adaptor member 30 and brake assembly 22b; if the adaptor linkage was implemented in the form of a pin joint, the pin would need to be sized to react the sheer forces, resulting in a large, heavy pin that may not be suitable for, or in some cases capable of being received by the conventional second brake rod connection point 26b' on the second brake assembly 22b.

Figure 3:
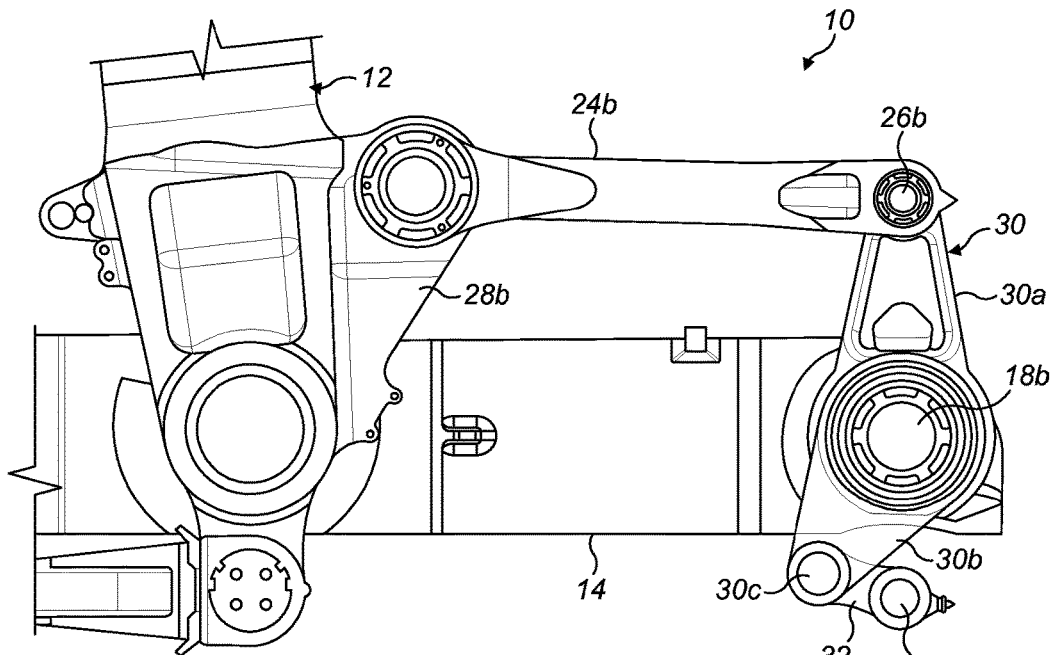
FIG. 3 is a diagram showing parts of the landing gear assembly of FIG. 2.

Referring additionally to FIG. 3, embodiments of the invention therefore include an adaptor linkage 32 arranged to build lost motion into the coupling between the adaptor member 30 and second brake assembly 22b for degrees of freedom which do not react brake torque. An upper portion 30a of the adaptor member 30 extends upwardly away from the axle 18b to position the second brake rod connection point 26b in near or actual horizontal alignment with the pin of the lower torque link lug 28b. A lower portion 30b of the adaptor member 30 extends downwardly away from the axle 18b and inwardly towards the slider axis to define an adaptor member connection point 30c that is spaced from the conventional second brake rod connection point 26b' on the second wheel assembly 22b. In the illustrated embodiment, the adaptor linkage 32 is in the form of a union link having a first end pivotally coupled via the pin joint 30c to the adaptor member 30 and a second end pivotally coupled via the pin joint 26b' to the brake assembly 22b. Thus, the union link 32 reacts brake torque without inhibiting horizontal and/or vertical relative displacement that can occur between the adaptor member 30 and brake assembly 22b due to flexing of the axle 18b.

Figure 4:
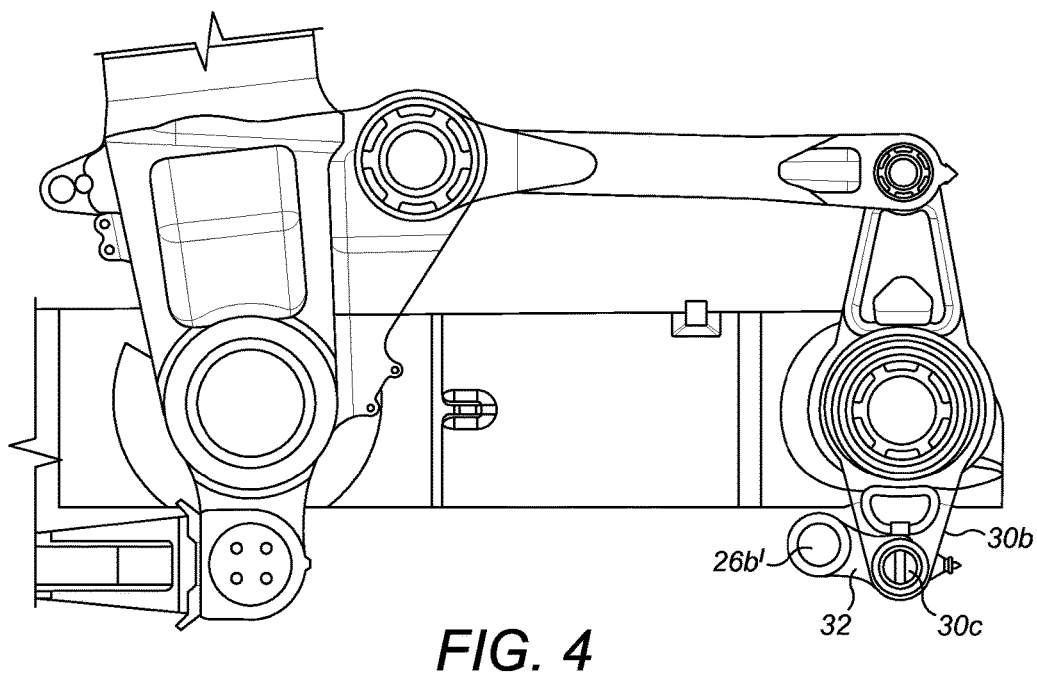
FIG. 4 is a diagram showing parts of a landing gear assembly according to a further embodiment of the invention.
Figure 5:
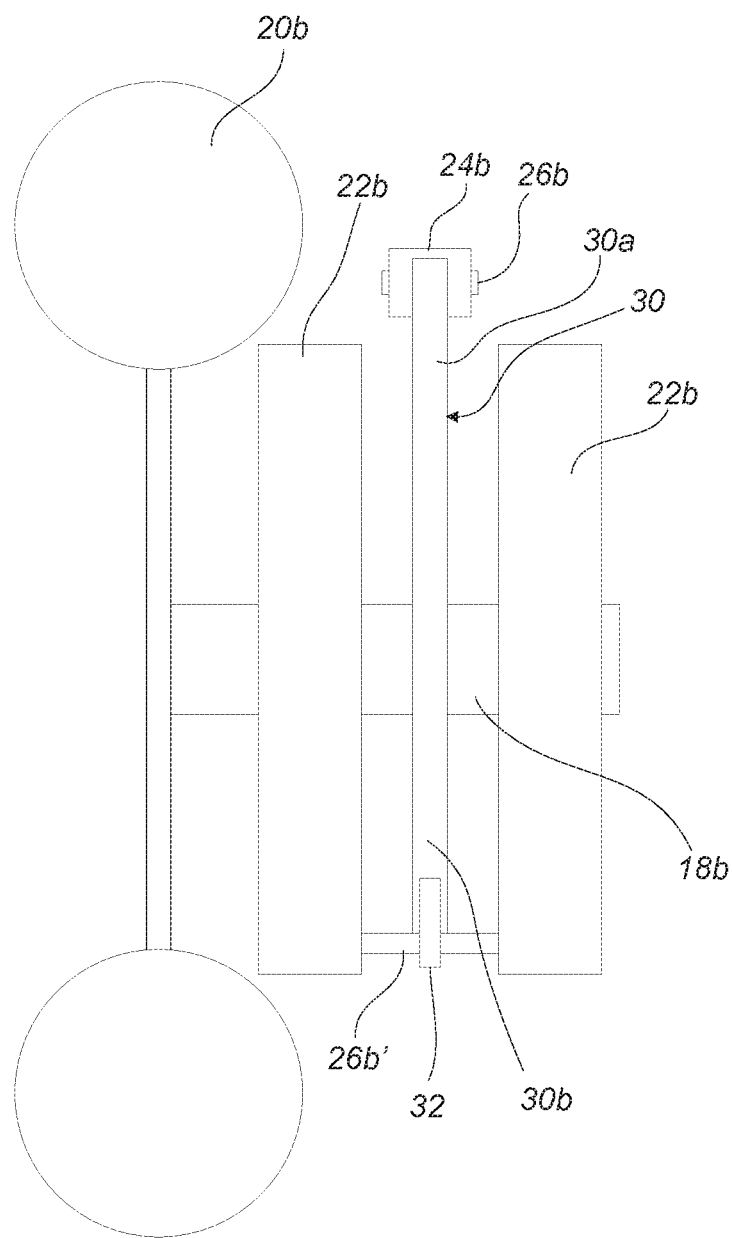
FIG. 5 is a schematic illustration of the assembly of FIG. 3, shown from the rear along the axis of the bogie beam.

FIG. 4 shows an alternative embodiment in which lower portion 30b of the adaptor member 30 extends downwardly away from the axle 18b and in which the conventional second brake rod connection point 26b' on the second wheel assembly 22b is positioned inwardly away from the adaptor member connection point 30c. This requires the brake assembly to be positioned with its conventional second brake rod connection point 26b' inwardly, but enables the adaptor member to be symmetrical about a longitudinal plane.

The adaptor member 30 and adaptor linkage 32 can in embodiments of the invention take any suitable form, such as a plate or bar. Either can be formed from any suitable aircraft landing gear material; for example, a metal such as aluminium or titanium, a hard plastics material, or a composite material. In other embodiments, the adaptor linkage 32 can be implemented as any suitable linkage that can build lost motion into the coupling between the adaptor member 30 and second brake assembly 22b for degrees of freedom which do not react brake torque; for example, a generally incompressible spring arranged to react load in tension and compression, or a stiff torsion spring arranged to react load in torsion.

The adaptor member 30 is provided on the opposite side of the brake assembly 22b with respect to the wheel assembly 20b. This can reduce the impact of the adaptor member 30 on the normal working of the brake assembly 22b and/or can place fewer restrictions on the size and shape of the adaptor member 30. However, in other embodiments the adaptor member 30 can be provide between the brake assembly 22b and the wheel assembly 20b.

Although the illustrated embodiment connects the second brake assembly 22b to the lower torque link lug 28b, it will be appreciated that an adaptor member 30 and adaptor linkage 32 according to embodiments of the invention can enable any brake assembly mounted on an axle to be connected to a non-conventional anchor point.

Embodiments of the invention can comprise a single axle landing gear, or a landing gear including three or more axles.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

We claim:

1. An aircraft landing gear assembly comprising:
   a main strut arranged to be movably coupled to an aircraft;
   an axle coupled to the main strut;
   a first brake assembly mounted on the axle;
   an adaptor member mounted on the axle, the adaptor member defining a brake rod connection point;
   a brake rod coupled to the adaptor member at the brake rod connection point and coupled to the landing gear assembly at an anchor point so as to inhibit rotation of the adaptor member about an axis of the axle; and
   an adaptor linkage coupled to the first brake assembly and to the adaptor member, the adaptor linkage being arranged to inhibit rotation of the first brake assembly about the axis of the axle relative to the adaptor member, and being arranged to permit movement between the first brake assembly and the adaptor member in one or more other degree of freedom.

2. The aircraft landing gear assembly according to claim 1, wherein the adaptor linkage is arranged to react the rotation of the first brake assembly relative to the adaptor member in tension or compression.

3. The aircraft landing gear assembly according to claim 1, wherein the brake rod connection point is located at an angular position that is distinct from an angular position of a connection point between the adaptor linkage and the first brake assembly.

4. The aircraft landing gear assembly according to claim 1, wherein the adaptor member is sized such that the brake rod connection point is spaced farther from the axis of the axle than a peripheral surface of the first brake assembly.

5. The aircraft landing gear assembly according to claim 1, wherein the adaptor linkage is pivotally coupled to the first brake assembly and to the adaptor member.

6. The aircraft landing gear assembly according to claim 1, wherein the brake rod is elongate.

7. The aircraft landing gear assembly according to claim 1, wherein the main strut comprises a shock strut having a main fitting coupled to a slider and further includes a torque link arranged to inhibit relative rotation of the slider relative to the main fitting about a longitudinal axis of the main fitting, and wherein the anchor point is defined by a torque link connection lug.

8. The aircraft landing gear assembly according to claim 1, wherein the axle is coupled to the main strut via a bogie beam.

9. The aircraft landing gear assembly according to claim 1, further comprising a second brake assembly mounted on the axle.

10. The aircraft landing gear assembly according to claim 9, wherein the adaptor linkage is coupled at one location to the adaptor member and at another location to both the first brake assembly and the second brake assembly so as to react rotation of both the first brake assembly and the second brake assembly.

11. The aircraft landing gear assembly according to claim 1, wherein the adaptor member is on the opposite side of the first break assembly with respect to the wheel assembly.

12. The aircraft landing gear assembly according to claim 1, wherein the axle comprises two or more axles, each of the two or more axles comprising a respective first brake assembly.

13. An aircraft landing gear assembly comprising:
   a main strut arranged to be movably coupled to an aircraft;
   an axle coupled to the main strut, the axle having an axle axis;
   a brake assembly mounted on the axle;
   an adaptor member mounted on the axle, the adaptor member defining a brake rod connection point;
   a brake rod coupled to the adaptor member at the brake rod connection point and coupled to the landing gear assembly at an anchor point so as to inhibit rotation of the adaptor member about the axle axis; and
   an adaptor linkage coupled to the brake assembly and to the adaptor member, the adaptor linkage being arranged to inhibit rotation of the brake assembly about the axle axis relative to the adaptor member, and being arranged to permit movement between the brake assembly and the adaptor member in one or more other degrees of freedom, wherein the adaptor linkage is arranged to permit movement between the brake assembly and the adaptor member in a vertical and horizontal manner relative to the axle axis.

* * * * *